United States Patent
Gu et al.

(10) Patent No.: US 11,378,852 B2
(45) Date of Patent: Jul. 5, 2022

(54) DISPLAY PANEL AND METHOD OF DRIVING IMAGE DISPLAY IN DISPLAY PANEL

(71) Applicants: HEFEI BOE OPTOELECTRONICS TECHNOLOGY CO., LTD., Anhui (CN); BOE Technology Group Co., Ltd., Beijing (CN)

(72) Inventors: Honggang Gu, Beijing (CN); Xianjie Shao, Beijing (CN); Chun Wang, Beijing (CN)

(73) Assignees: Hefei BOE Optoelectronics Technology Co., Ltd., Anhui (CN); BOE Technology Group Co., Ltd., Beijing (CN)

(*) Notice: Subject to any disclaimer, the term of this patent is extended or adjusted under 35 U.S.C. 154(b) by 674 days.

(21) Appl. No.: 16/330,866

(22) PCT Filed: Jun. 26, 2018

(86) PCT No.: PCT/CN2018/092831
§ 371 (c)(1),
(2) Date: Mar. 6, 2019

(87) PCT Pub. No.: WO2019/144566
PCT Pub. Date: Aug. 1, 2019

(65) Prior Publication Data
US 2021/0356796 A1    Nov. 18, 2021

(30) Foreign Application Priority Data
Jan. 23, 2018 (CN) .......................... 201810062703.5

(51) Int. Cl.
*G02F 1/1347* (2006.01)
*G02F 1/1335* (2006.01)
(Continued)

(52) U.S. Cl.
CPC ...... *G02F 1/13478* (2021.01); *G02F 1/13439* (2013.01); *G02F 1/133553* (2013.01);
(Continued)

(58) Field of Classification Search
CPC .......... G02F 1/13478; G02F 1/133553; G02F 1/13439; G02F 1/133638; G02F 2201/16; G02F 2203/09; G02F 2413/01
See application file for complete search history.

(56) References Cited

U.S. PATENT DOCUMENTS

2015/0002781 A1    1/2015  Ma
2018/0136518 A1*   5/2018  Min ................. G02F 1/133602
2020/0333645 A1*  10/2020  Robinson ............... H04N 13/30

FOREIGN PATENT DOCUMENTS

CN        1924666 A       3/2007
CN      101153980 A  *    4/2008
(Continued)

OTHER PUBLICATIONS

International Search Report & Written Opinion dated Oct. 19, 2018, regarding PCT/CN2018/092831.

*Primary Examiner* — Nathanael R Briggs
(74) *Attorney, Agent, or Firm* — Intellectual Valley Law, P.C.

(57) ABSTRACT

The present application provides a display panel having a first array substrate, a first liquid crystal layer, a second array substrate, a second liquid crystal layer, a reflective layer, and a counter substrate. The second array substrate is between the first array substrate and the counter substrate; the first liquid crystal layer is between the first array substrate and the second array substrate; the second liquid crystal layer is between second array substrate and the counter substrate; and the reflective layer is between the first liquid crystal layer and the second liquid crystal layer. The display panel has a plurality of reflective regions and a plurality of (Continued)

transmissive regions. The reflective layer is present in the plurality of reflective regions and absent in the plurality of transmissive regions.

20 Claims, 10 Drawing Sheets

(51) Int. Cl.
*G02F 1/1343* (2006.01)
*G02F 1/13363* (2006.01)
(52) U.S. Cl.
CPC .... *G02F 1/133638* (2021.01); *G02F 2201/16* (2013.01); *G02F 2203/09* (2013.01); *G02F 2413/01* (2013.01)

(56) References Cited

FOREIGN PATENT DOCUMENTS

| | | |
|---|---|---|
| CN | 101153980 A | 4/2008 |
| CN | 102654682 A | 9/2012 |
| CN | 105892140 A | 8/2016 |

\* cited by examiner

DISPLAY PANEL AND METHOD OF DRIVING IMAGE DISPLAY IN DISPLAY PANEL

CROSS-REFERENCE TO RELATED APPLICATION

This application is a national stage application under 35 U.S.C. § 371 of International Application No. PCT/CN2018/092831, filed Jun. 26, 2018, which claims priority to Chinese Patent Application No. 201810062703.5, filed Jan. 23, 2018, the contents of which are incorporated by reference in the entirety.

TECHNICAL FIELD

The present invention relates to display technology, more particularly, to a display panel, a method of driving image display in a display panel, and a method of fabricating a display panel.

BACKGROUND

Liquid crystal display panels can be categorized into several types: transmissive display panel, reflective display panel, and transflective display panel. The transflective display panel may have both a transmissive mode and a reflective mode. When a light intensity of ambient light is relative low, the transmissive mode may be adopted by turning on a back light of the display panel to display an image. When a light intensity of ambient light is relative high, the reflective mode may be adopted by utilizing a reflective layer in the display panel to reflect ambient light to display an image.

SUMMARY

In one aspect, the present invention provides a display panel having a plurality of subpixels, comprising a first array substrate, a first liquid crystal layer, a second array substrate, a second liquid crystal layer, a reflective layer, and a counter substrate, wherein the second array substrate is between the first array substrate and the counter substrate; the first liquid crystal layer is between the first array substrate and the second array substrate; the second liquid crystal layer is between second array substrate and the counter substrate; and the reflective layer is between the first liquid crystal layer and the second liquid crystal layer; wherein the display panel has a plurality of reflective regions and a plurality of transmissive regions, each of the plurality of subpixels having at least one of the plurality of reflective regions and at least one of the plurality of transmissive regions; and the reflective layer is present in the plurality of reflective regions and absent in the plurality of transmissive regions.

Optionally, the display panel further comprises a retardation film on a side of the second liquid crystal layer distal to the second array substrate.

Optionally, the retardation film is a λ/4 retardation film.

Optionally, the display panel further comprises a first polarizer on a side of the first array substrate distal to the first liquid crystal layer and a second polarizer on a side of the second liquid crystal layer distal to the second array substrate.

Optionally, the display panel further comprises a retardation film between the second polarizer and the counter substrate.

Optionally, transmission axes of the first polarizer and the second polarizer are substantially perpendicular to each other.

Optionally, transmission axes of the first polarizer and the second polarizer are substantially parallel to each other.

Optionally, the first liquid crystal layer has a first thickness along a direction substantially from the first array substrate toward the counter substrate; the second liquid crystal layer has a second thickness along the direction substantially from the first array substrate toward the counter substrate; and the first thickness and the second thickness are substantially same.

Optionally, the display panel further comprises a first electrode layer and a second electrode layer configured to apply a first electric field to the first liquid crystal layer; and a third electrode layer and a fourth electrode layer configured to apply a second electric field to the second liquid crystal layer.

Optionally, the first electrode layer is on a side of the first array substrate facing the second array substrate, the second electrode layer is on a side of the second array substrate facing the first array substrate, and the first liquid crystal layer is between the first electrode layer and the second electrode layer; and the third electrode layer is on a side of the second array substrate facing the counter substrate, the fourth electrode layer is on a side of the counter substrate facing the second array substrate, and the second liquid crystal layer is between the third electrode layer and the fourth electrode layer.

Optionally, the third electrode layer comprises a plurality of reflective electrode blocks respectively in the plurality of reflective regions and a plurality of substantially transparent electrode blocks respectively in the plurality of transmissive regions; and the plurality of reflective electrode blocks constitute the reflective layer.

Optionally, the second electrode layer comprises a plurality of reflective electrode blocks respectively in the plurality of reflective regions and a plurality of substantially transparent electrode blocks respectively in the plurality of transmissive regions; and the plurality of reflective electrode blocks constitute the reflective layer.

Optionally, each of the first liquid crystal layer and the second liquid crystal layer has an optical retardation value substantially equal to a quarter wavelength of an incident light upon application of an electric field; and wherein the display panel further comprises a λ/4 retardation film on a side of the second liquid crystal layer distal to the second array substrate.

Optionally, the reflective layer is on a side of the second array substrate facing the second liquid crystal layer.

Optionally, the reflective layer is on a side of the second array substrate facing away the second liquid crystal layer.

In another aspect, the present invention provides a display apparatus comprising the display panel described herein, a back light, and a driving circuit configured to apply a first electric field to the first liquid crystal layer and a second electric field to the second liquid crystal layer In another aspect, the present invention provides a method of driving image display in a display panel having a plurality of subpixels; wherein the display panel comprises a first array substrate, a first liquid crystal layer, a second array substrate, a second liquid crystal layer, a reflective layer, and a counter substrate; wherein the second array substrate is between the first array substrate and the counter substrate; the first liquid crystal layer is between the first array substrate and the second array substrate; the second liquid crystal layer is between second array substrate and the counter substrate; and the reflective layer is between the first liquid crystal layer and the second liquid crystal layer; wherein the display panel has a plurality of reflective regions and a plurality of transmissive regions, each of the plurality of subpixels having at least one of the plurality of reflective regions and at least one of the plurality of transmissive regions; and the reflective layer is present in the plurality of reflective regions and absent in the plurality of transmissive regions; wherein the method comprises selectively driving image display in the display panel in a reflective display mode and a transmissive display mode.

Optionally, the method comprises simultaneously applying a first electric field to the first liquid crystal layer and applying a second electric field to the second liquid crystal layer thereby controlling the display panel to display image in the transmissive display mode.

Optionally, the method comprises applying a second electric field to the second liquid crystal layer thereby controlling the display panel to display image in the reflective display mode.

Optionally, an electrical field is not applied to the first liquid crystal layer.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In a conventional transflective display panel, each subpixel includes a reflective display region and a transmissive display region. In the junction between the reflective display region and the transmissive display region, the orientations of the liquid crystal molecules may be disturbed. Liquid crystal molecules in the junction may have inconsistent orientations, leading to light leakage problem in the dark state due to the disorder of the liquid crystal molecules in the junction.

Accordingly, the present disclosure provides, inter alia, a display panel, a method of driving image display in a display panel, and a method of fabricating a display panel that substantially obviate one or more of the problems due to limitations and disadvantages of the related art. In one aspect, the present disclosure provides a display panel having a plurality of subpixels. In some embodiments, the display panel includes a first array substrate, a first liquid crystal layer, a second array substrate, a second liquid crystal layer, a reflective layer, and a counter substrate. Optionally, the second array substrate is between the first array substrate and the counter substrate; the first liquid crystal layer is between the first array substrate and the second array substrate; the second liquid crystal layer is between second array substrate and the counter substrate; and the reflective layer is between the first liquid crystal layer and the second liquid crystal layer. Optionally, the display panel has a plurality of reflective regions and a plurality of transmissive regions. Each of the plurality of subpixels has at least one of the plurality of reflective regions and at least one of the plurality of transmissive regions. Optionally, each of the plurality of subpixels has one of the plurality of reflective regions and one of the plurality of transmissive regions. The reflective layer is present in the plurality of reflective regions and absent in the plurality of transmissive regions.

Figure 1:
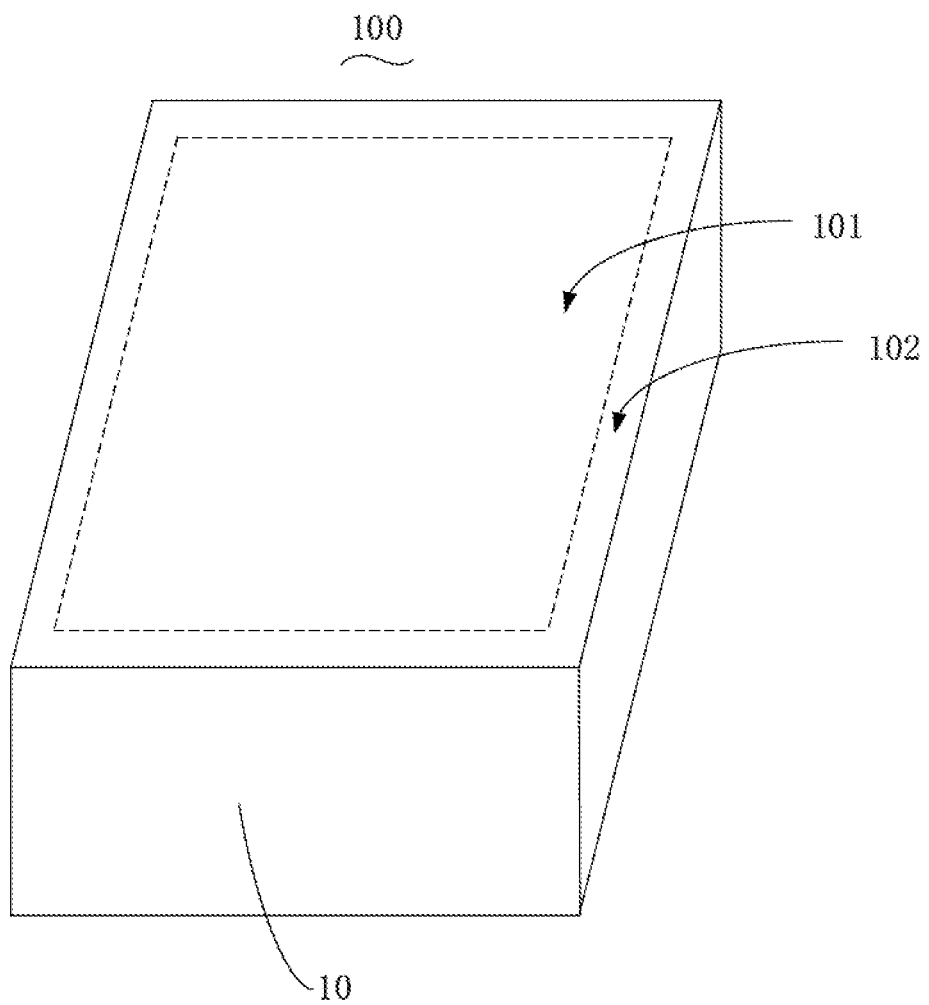
FIG. 1 is a perspective view of a display apparatus in some embodiments according to the present disclosure.

FIG. 1 is a perspective view of a display apparatus in some embodiments according to the present disclosure. Referring to FIG. 1, the display apparatus 100 in some embodiments has a display area 101 and a peripheral area 102. The peripheral area 102 surrounds the periphery of the display area 101. The display area 101 is an area of a display panel where image is actually displayed. The peripheral area 102 is an area where various circuits and wires are provided to transmit signals to the display panel.

Figure 2A:
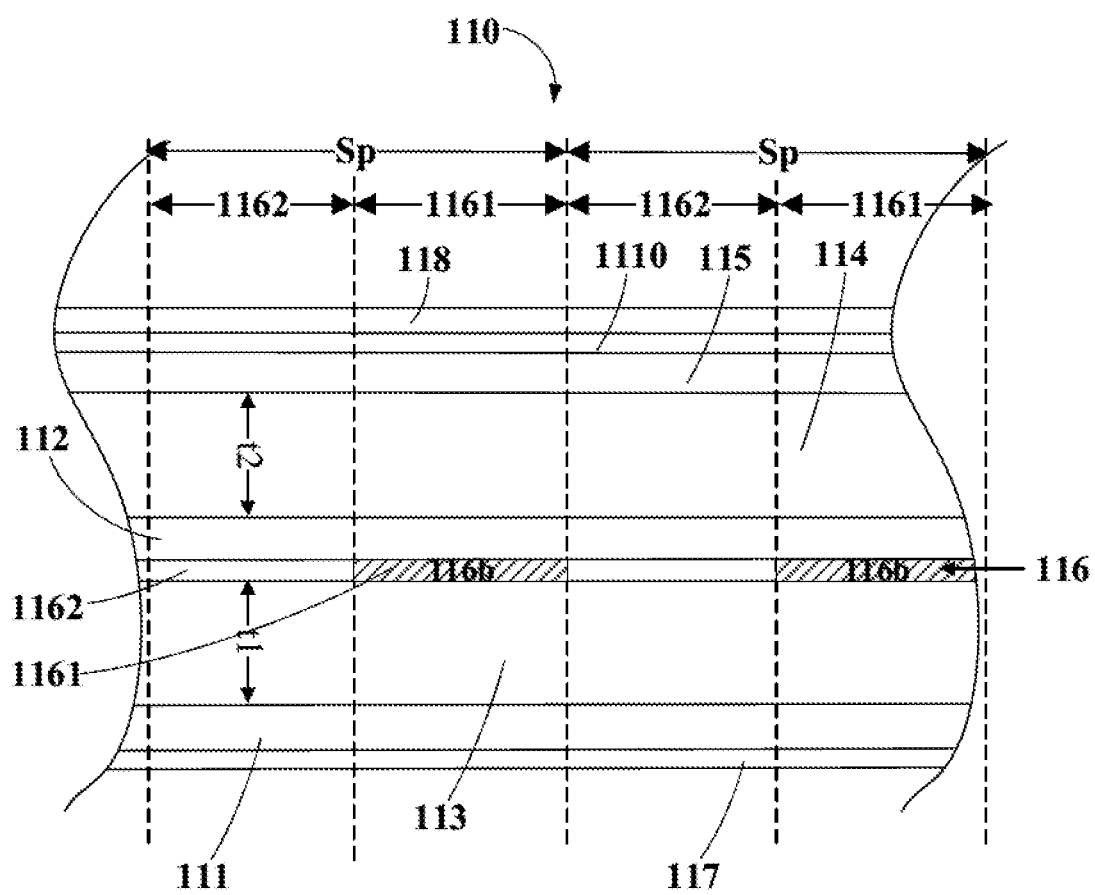
FIG. 2A is a partial cross-sectional view of a display panel in some embodiments according to the present disclosure.

FIG. 2A is a partial cross-sectional view of a display panel some embodiments according to the present disclosure. Referring to both FIG. 1 and FIG. 2A, the display apparatus 100 in some embodiments includes a display panel 110. In some embodiments, the display panel 110 includes a first array substrate 111, a second array substrate 112, a first liquid crystal layer 113, a second liquid crystal layer 114 and a counter substrate 115. The counter substrate 115 is disposed opposite to the first array substrate 111. The second array substrate 112 is between the first array substrate 11/ and the counter substrate 115. The first liquid crystal layer 113 is between the first array substrate 111 and the second array substrate 112. The second liquid crystal layer 114 is between the second array substrate 112 and the counter substrate 115.

Figure 2B:
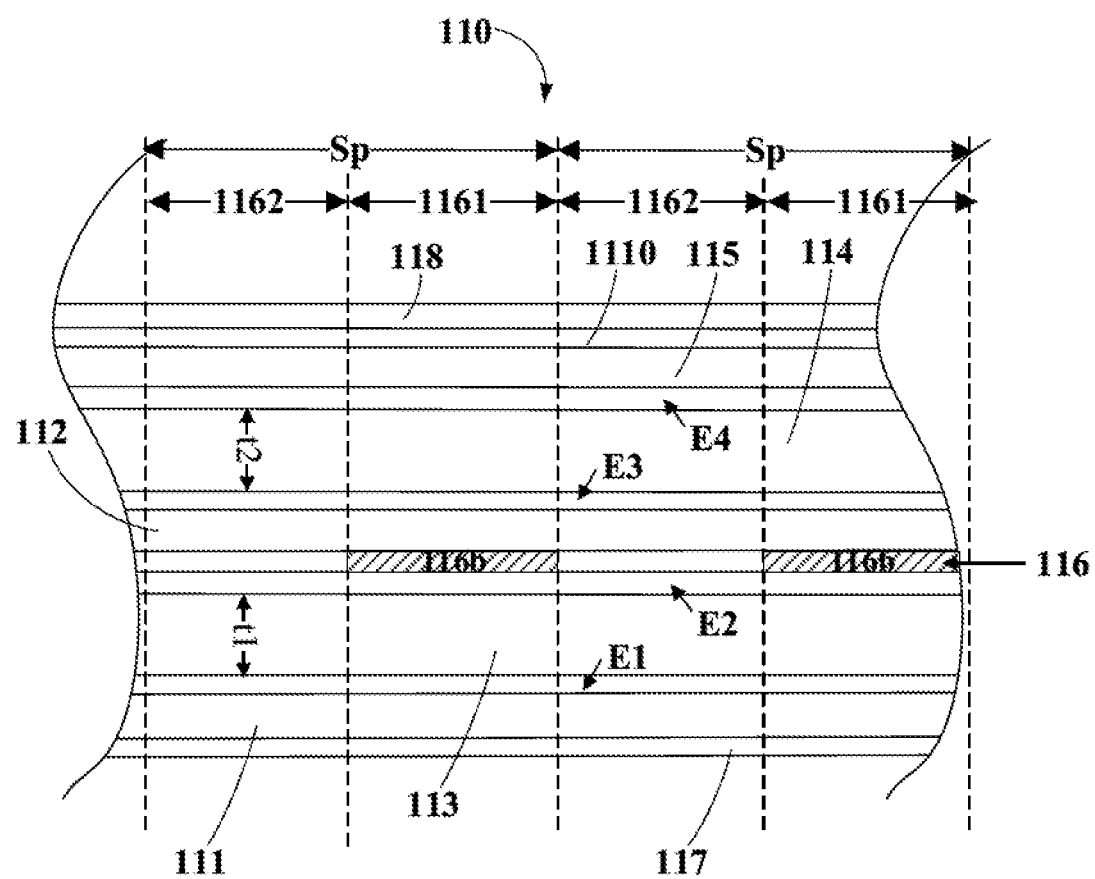
FIG. 2B is a partial cross-sectional view of a display panel in some embodiments according to the present disclosure.

FIG. 2B is a partial cross-sectional view of a display panel some embodiments according to the present disclosure. Referring to FIG. 2B, in some embodiments, the display panel 110 further includes a first electrode layer E1 and a second electrode layer E2 configured to apply a first electric field to the first liquid crystal layer 113, and a third electrode layer E3 and a fourth electrode layer E4 configured to apply a second electric field to the second liquid crystal layer 114. As shown in FIG. 2B, in some embodiments, the first electrode layer E1 is on a side of the first array substrate 111 facing the second array substrate 112, the second electrode layer E2 is on a side of the second array substrate 112 facing the first array substrate 111, and the first liquid crystal layer 113 is between the first electrode layer E1 and the second electrode layer E2. In some embodiments, the third electrode layer E3 is on a side of the second array substrate 112 facing the counter substrate 115, the fourth electrode layer E4 is on a side of the counter substrate 115 facing the second array substrate 112, and the second liquid crystal layer 114 is between the third electrode layer E3 and the fourth electrode layer E4. When a voltage difference is generated between the first electrode layer E1 and the second electrode layer E2, a first electric field is formed to control the first liquid crystal layer 113. Together, the first array substrate 111, the first liquid crystal layer 113 and the second array substrate 112 form a first liquid crystal cell. When a voltage difference is generated between the third electrode layer E3 and the fourth electrode layer E4, a second electric field is formed to control the second liquid crystal layer 114. Together, the second array substrate 112, the second liquid crystal layer 114 and the counter substrate 115 form a second liquid crystal cell.

In some embodiments, the first electric field is a fringe electric field. Optionally, the first electrode layer and the second electrode layer are configured to control the first liquid crystal layer in an In-plane Switching (IPS) mode. Optionally, the first electrode layer and the second electrode layer are configured to control the first liquid crystal layer in an Advanced Super Dimension Switch (ADS) mode. Optionally, the first electrode layer and the second electrode layer are both between the first array substrate and the first liquid crystal layer, e.g., are both on a side of the first liquid crystal layer distal to the second array substrate.

In some embodiments, the second electric field is a fringe electric field. Optionally, the third electrode layer and the fourth electrode layer are configured to control the second liquid crystal layer in an In-plane Switching (IPS) mode. Optionally, the third electrode layer and the fourth electrode layer are configured to control the second liquid crystal layer in an Advanced Super Dimension Switch (ADS) mode. Optionally, the third electrode layer and the fourth electrode layer are both between the second array substrate and the second liquid crystal layer, e.g., are both on a side of the second liquid crystal layer distal to the counter substrate, and on a side of the second array substrate distal to the first liquid crystal layer.

In some embodiments, and referring to FIG. 2A, the first liquid crystal layer 113 has a first thickness t1 along a direction substantially from the first array substrate 11 toward the counter substrate 115, and the second liquid crystal layer 114 has a second thickness t2 along the direction substantially from the first array substrate 111 toward the counter substrate 115. Optionally, the first thickness t1 and the second thickness t2 are substantially the same. As used herein, the term "substantially the same" refers to a difference between two values not exceeding 10%, e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%.

In some embodiments, the display panel 110 further includes a reflective layer 116. The reflective layer 116 is between the first liquid crystal layer 113 and the second liquid crystal layer 114. The reflective layer 116 includes at least one reflective surface, e.g., a surface on a side of the reflective layer facing the second liquid crystal layer 114. In some embodiments, and referring to FIG. 2A and FIG. 2B, the display panel 110 has a plurality of reflective regions 1161 and a plurality of transmissive regions 1162. Optionally, each of the plurality of subpixels Sp has at least one of the plurality of reflective regions 1161 and at least one of the plurality of transmissive regions 1162. In FIG. 2A and FIG. 2B, each of the plurality of subpixels Sp has one of the plurality of reflective regions 1161 and one of the plurality of transmissive regions 1162. As shown in FIG. 2A and FIG. 2B, the reflective layer 116 is present in the plurality of reflective regions 1161 and absent in the plurality of transmissive regions 1162. For example, the reflective layer 161 includes a plurality of reflective blocks 116b, each of which is in one of the plurality of reflective regions 1161. The plurality of reflective blocks 116b are absent in the plurality of transmissive regions 1162.

In some embodiments, the display panel 110 is configured to display image selectively in a reflective display mode and a transmissive display mode. Optionally, the display panel 110 is configured to display image in the reflective display mode in the plurality of reflective regions 1161. Optionally, the display panel 110 is configured to display image in the transmissive display mode in the plurality of transmissive regions 1162. In one example, the display panel 110 is a transflective display panel.

In some embodiments, the display panel 110 is configured to display image in the transmissive display mode in the plurality of transmissive regions 1162. In the transmissive display mode, the first electrode layer E1 and the second electrode layer E2 are configured to have a first voltage difference between the first electrode layer E1 and the second electrode layer E2, thereby forming a first electric field applied to the first liquid crystal layer 113; the third electrode layer E3 and the fourth electrode layer E4 are configured to have a second voltage different between the third electrode layer E3 and the fourth electrode layer E4, thereby forming a second electric field applied to the second liquid crystal layer 114.

In some embodiments, the display panel 110 is configured to display image in the reflective display mode in the plurality of reflective regions 1161. In the reflective display mode, the third electrode layer E3 and the fourth electrode layer E4 are configured to have a second voltage different between the third electrode layer E3 and the fourth electrode layer E4, thereby forming a second electric field applied to the second liquid crystal layer 114. However, in the reflective display mode, an electric field is not applied to the first liquid crystal layer, e.g., the first voltage difference between the first electrode layer E1 and the second electrode layer E2 is substantially zero or a small value (e.g., less than 0.1 V).

Optionally, to set display panel 110 in the reflective mode, the voltage is applied to the third electrode layer E3 on the second array substrate 112 and the fourth electrode layer E4 on the counter substrate 115, but no voltage is applied to the first electrode layer E1 on the first array substrate 111 and the second electrode layer E2 on the second array substrate 112. Accordingly, the second liquid crystal layer 114 is applied with an electric field, but the first liquid crystal layer 113 is not applied with an electric field. Optionally, to set the display panel 110 in the transmissive mode, the voltage is applied to the third electrode layer E3 on the second array substrate 112 and the fourth electrode layer E4 on the counter substrate 115, and the voltage is also applied to the first electrode layer E1 on the first array substrate 111 and the second electrode layer E2 on the second substrate. Accordingly, both the second liquid crystal layer 114 and the first liquid crystal layer 113 are applied with electric fields respectively.

By having two liquid crystal layers in separate layers and by having the plurality of reflective regions 1161 and the plurality of transmissive regions 1162 in the display panel 110, the present disclosure obviates the issue that, in the junction between the reflective display region and the transmissive display region, the orientations of the liquid crystal molecules may be disturbed. In the present disclosure, liquid crystal molecules in each of the liquid crystal layers have a substantially the same orientation, thereby substantially obviating the light leakage problem in the dark state due to the disorder of the liquid crystal molecules.

Referring to FIG. 2A and FIG. 2B, in some embodiments, the reflective layer 116 is disposed on a side of the second array substrate 112 distal to the second liquid crystal layer 114 and facing the first array substrate 111. Optionally, the reflective layer 116 is directly adjacent to the second array substrate 112. Optionally, the reflective layer 116 is in direct contact with (e.g., without any intermediate structure or layer) the second array substrate 112.

Figure 2C:
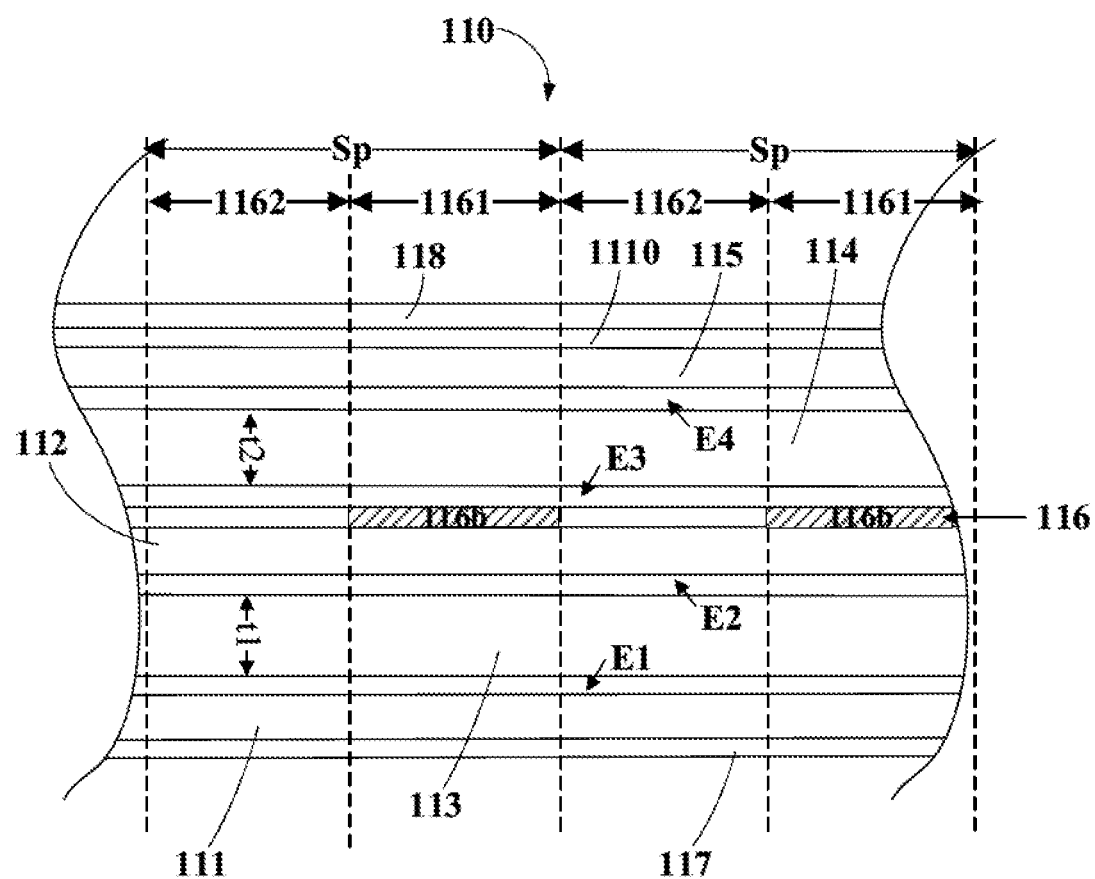
FIG. 2C is a partial cross-sectional view of a display panel in some embodiments according to the present disclosure.

FIG. 2C is a partial cross-sectional view of a display panel in some embodiments according to the present disclosure. Referring to FIG. 2C, the reflective layer 116 is disposed on a side of the second array substrate 112 facing the second liquid crystal layer 114 and facing away the first array substrate 111. Optionally, the reflective layer 116 is directly adjacent to the second array substrate 112. Optionally, the reflective layer 116 is in direct contact with (e.g., without any intermediate structure or layer) the second array substrate 112.

Figure 2D:
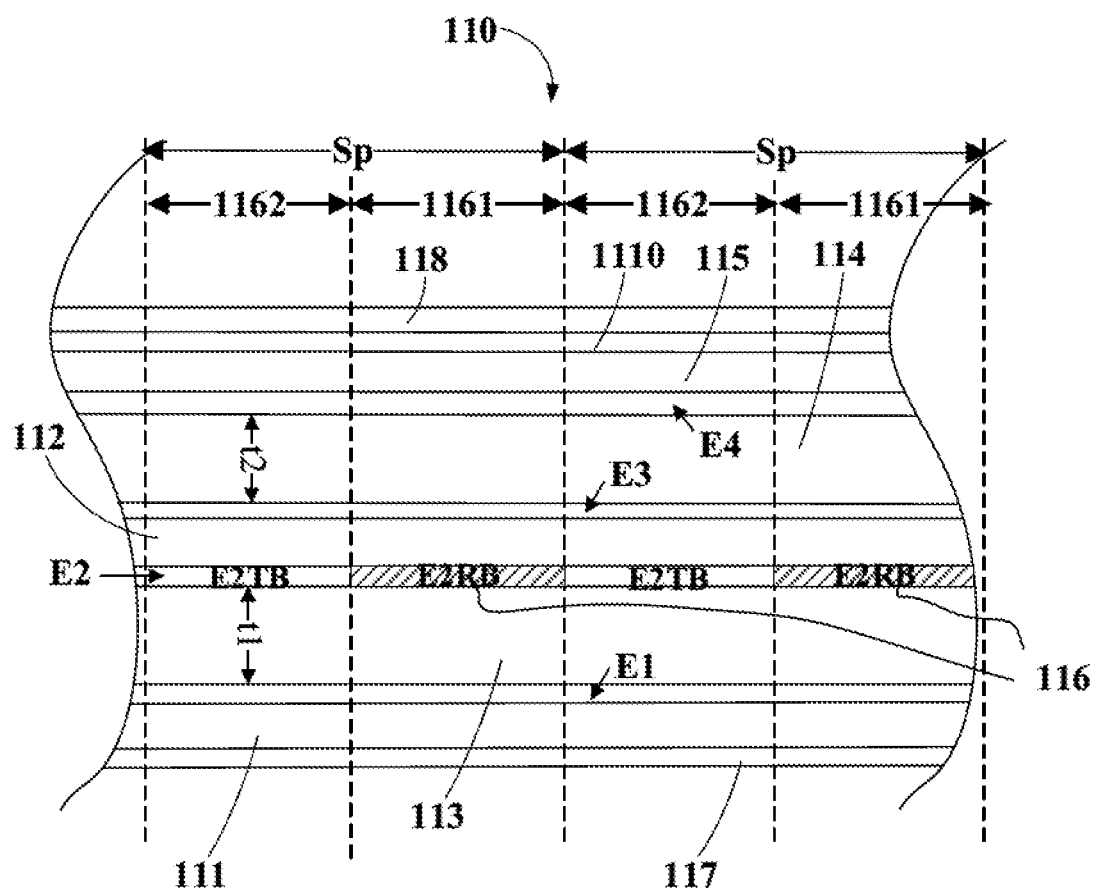
FIG. 2D is a partial cross-sectional view of a display panel in some embodiments according to the present disclosure.

FIG. 2D is a partial cross-sectional view of a display panel in some embodiments according to the present disclosure. Referring to FIG. 2D, in some embodiments, the second electrode layer E2 includes a plurality of reflective electrode blocks E2RB respectively in the plurality of reflective regions 1161 and a plurality of substantially transparent electrode blocks E2TB respectively in the plurality of transmissive regions 1162. The plurality of reflective electrode blocks E2RB constitute the reflective layer 116. As used herein, the term "substantially transparent" means at least 50 percent (e.g., at least 60 percent, at least 70 percent, at least 80 percent, at least 90 percent, and at least 95 percent) of light in the visible wavelength range transmitted therethrough. As used herein, the term "reflective" means less than 50 percent (e.g., at least 40 percent, at least 30 percent, at least 20 percent, at least 10 percent, and at least 5 percent) of light in the visible wavelength range transmitted therethrough.

Figure 2E:
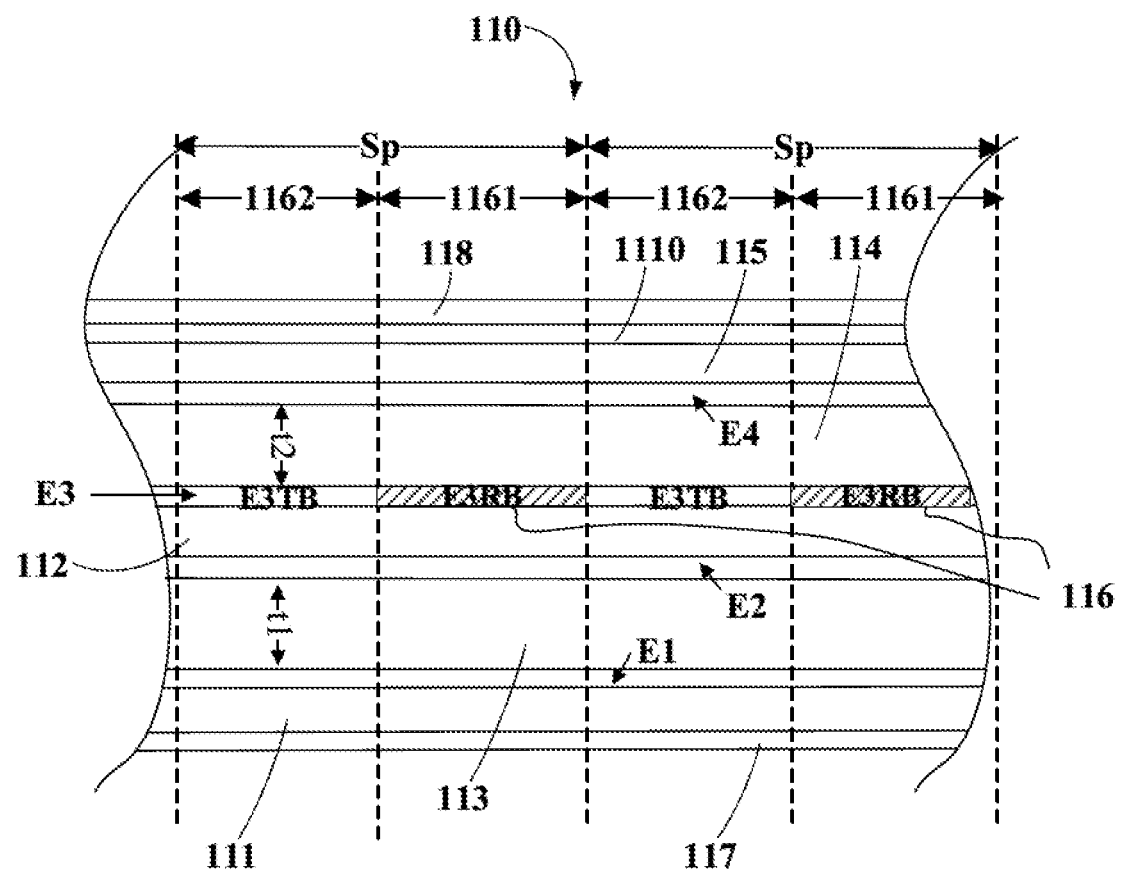
FIG. 2E is a partial cross-sectional view of a display panel in some embodiments according to the present disclosure.

FIG. 2E is a partial cross-sectional view of a display panel in some embodiments according to the present disclosure. Referring to FIG. 2E, the third electrode layer E3 includes a plurality of reflective electrode blocks E3RB respectively in the plurality of reflective regions 1161 and a plurality of substantially transparent electrode blocks E2TB respectively in the plurality of transmissive regions 1162. The plurality of reflective electrode blocks E3RB constitute the reflective layer 116.

In some embodiments, and referring to FIGS. 2A to 2E, the display panel 110 further includes a retardation film 1110. Optionally, the retardation film 1110 is on a side of the second liquid crystal layer 114 distal to the second array substrate 112. Optionally, the retardation film 1110 has an optical retardation value substantially equal to a quarter wavelength of an incident light, e.g., the retardation film 1110 is a λ/4 retardation film.

In some embodiments, and referring to FIGS. 2A to 2E, the display panel 110 includes a first polarizer 117 and a second polarizer 118. The first polarizer 117 is on a side of the first array substrate 111 distal to the first liquid crystal layer 113. The second polarizer 118 is on a side of the counter substrate 115 distal to the second liquid crystal layer 114. Optionally, the retardation film 1110 is between the second polarizer 118 and the counter substrate 115.

In some embodiments, the retardation phase of each of the first liquid crystal layer 113 and the second liquid crystal layer 114 corresponds to the retardation phase of the retardation film 1110. In one example, the first liquid crystal layer 113, the second liquid crystal layer 114, and the retardation film 1110 are configured to respectively have retardation phases such that a linear polarized light is generated by the retardation film 1110 and provided to the second polarizer 118 prior to exiting the display panel 110, upon application of a second electric field to the second liquid crystal layer 114 but without a first electric field applied to the first liquid crystal layer 113. In another example, the first liquid crystal layer 113, the second liquid crystal layer 114, and the retardation film 1110 are configured to respectively have retardation phases such that a circularly polarized light is generated by the retardation film 1110 and provided to the second polarizer 118 prior to exiting the display panel 110, upon application of a first electric field to the first liquid crystal layer 113 and a second electric field to the second liquid crystal layer 114 simultaneously. The working principle of the reflective display mode will be explained in further details below.

In one specific example, each of the first liquid crystal layer 113 and the second liquid crystal layer 114 has an optical retardation value substantially equal to a quarter wavelength of an incident light (e.g., a λ/4 retard liquid crystal layer) upon application of an electric field (e.g., the first electric field or the second electric field). Optionally, the display panel further includes the retardation film 1110 on a side of the second liquid crystal layer 114 distal to the second array substrate 112 and optionally between the second polarizer 118 and the counter substrate 115, and the retardation film 1110 has an optical retardation value substantially equal to a quarter wavelength of an incident light (e.g., a λ/4 retardation film). The working principle of the reflective display mode will be explained in further details below.

Figure 3A:
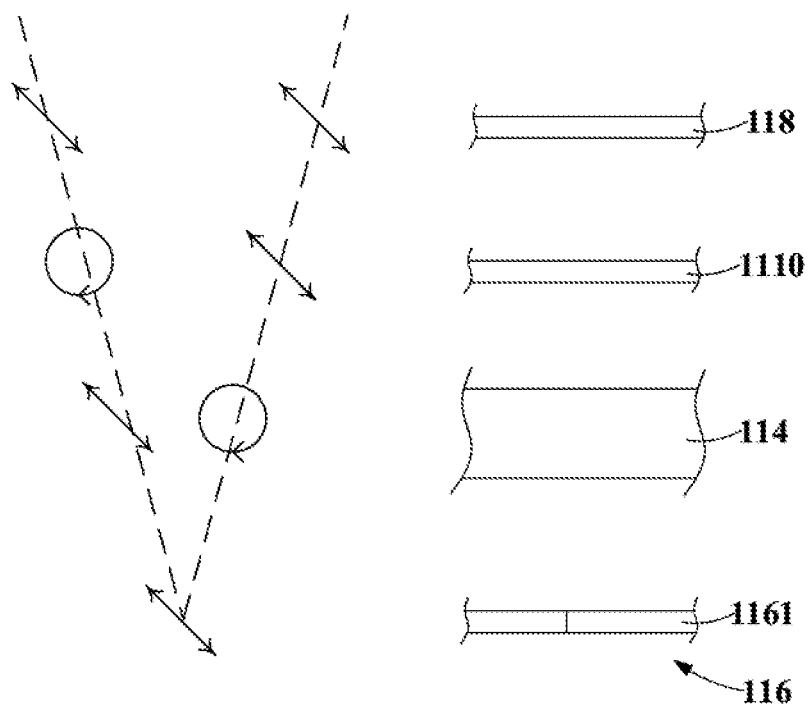
FIGS. 3A to 3B illustrates a work principle of a display panel in a reflective display mode in some embodiments according to the present disclosure.
Figure 3B:
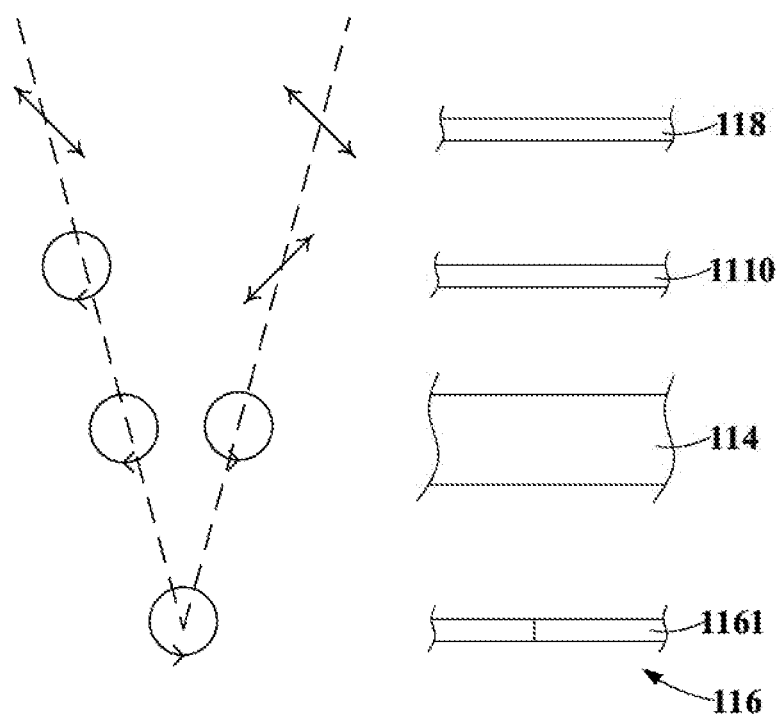

FIGS. 3A to 3B illustrates a work principle of a display panel in a reflective display mode in some embodiments according to the present disclosure. Referring to FIG. 3A and FIG. 3B, when a light intensity of the ambient light is relatively high, the display panel 110 may be configured to display image in the reflective display mode. For example, in the reflective display mode, a back light of the display panel may be turned off. The ambient light enters the display panel 110 from a side of the counter substrate 115 distal to the second liquid crystal layer 114. The ambient light transmits through the second polarizer 118, to the retardation film 1110, then to the second liquid crystal layer 114. Subsequently, the light is reflected by the plurality of reflective blocks 116b of the reflective layer 116. The reflected light transmits to the second liquid crystal layer 114, to the retardation film 1110, then to the second polarizer 118.

Referring to FIG. 3A, in some embodiments the display panel 110 is in the reflective display mode. In FIG. 3A, a second electric field is applied to the second liquid crystal layer 114, however, an electric field is not applied to the first liquid crystal layer 113. Thus, the second liquid crystal layer 114 has an optical retardation value greater than zero (e.g., substantially equal to a quarter wavelength of an incident light) whereas the first liquid crystal layer 113 has an optical retardation value substantially equal to zero. The incident ambient light first transmits through the second polarizer 118, and becomes a linearly polarized light. The linearly polarized light transmits through the retardation film 1110 and becomes right circularly polarized light. The right circularly polarized light becomes a linearly polarized light, after transmitting through the second liquid crystal layer 114 when a second electric field is applied to the second liquid crystal layer 114. The linearly polarized light is then reflected by the reflective layer 116, the linearly polarized light is reflected toward the second liquid crystal layer 114. The reflected linearly polarized light becomes a right circularly polarized light again after transmitting through the second liquid crystal layer 114. The right circularly polarized light then transmits through the retardation film 1110, and becomes a linearly polarized light having a polarization direction substantially parallel to a direction of a transmission axis of the second polarizer 118. The linearly polarized light can transmit through the second polarizer 118. In this mode, the display panel 110 is in bright state.

Referring to FIG. 3B, an electric field is not applied to either the first liquid crystal layer 113 or the second liquid crystal layer 114. Thus, each of the first liquid crystal layer 113 and the second liquid crystal layer 114 has an optical retardation value substantially equal to zero. The incident ambient light first transmits through the second polarizer 118, and becomes a linearly polarized light. The linearly polarized light transmits through the retardation film 1110 and becomes right circularly polarized light. When an electric field is not applied to the second liquid crystal layer 114 of the display panel 110, the right circularly polarized light remains as a right circularly polarized light after transmitting through the second liquid crystal layer 114. The right circularly polarized light is then reflected by the reflective layer 116, becomes a left circularly polarized light reflected toward the second liquid crystal layer 114. An electric field is not applied to the second liquid crystal layer 114, the left circularly polarized light remains as a left circularly polarized light after transmitting through the second liquid crystal layer 114 the second time. The left circularly polarized light transmits through the retardation film 1110, and becomes a linearly polarized light having a polarization direction substantially perpendicular to the direction of the transmission axis of the second polarizer 118. As a result, no light passes through the second polarizer 118. In this mode, the display panel is in dark state.

In some embodiments, transmission axes of the first polarizer 117 and the second polarizer 118 are substantially perpendicular to each other. In one example, a polarization angle of the second polarizer 118 is set at approximately 135° (e.g., relative to an alignment direction of an alignment film in the display panel 110), and a polarization angle of the first polarizer 117 is set at approximately 45° (e.g., relative to the alignment direction of the alignment film in the display panel 110). Optionally, the polarization angles of the first polarizer 117 and the second polarizer 118 can be set at other degrees, and parameters of other layers can be adjusted accordingly.

In some embodiments, transmission axes of the first polarizer 117 and the second polarizer 118 are substantially parallel to each other. In one example, a polarization angle of the first polarizer 117 is set at approximately 45° (e.g., relative to the alignment direction of the alignment film in the display panel 110), and a polarization angle of the second polarizer 118 is set at approximately 135° (e.g., relative to an alignment direction of an alignment film in the display panel 110). Parameters of other layers can be adjusted accordingly to control the display panel to be respectively in different modes corresponding to a bright state and a dark state.

Figure 4A:
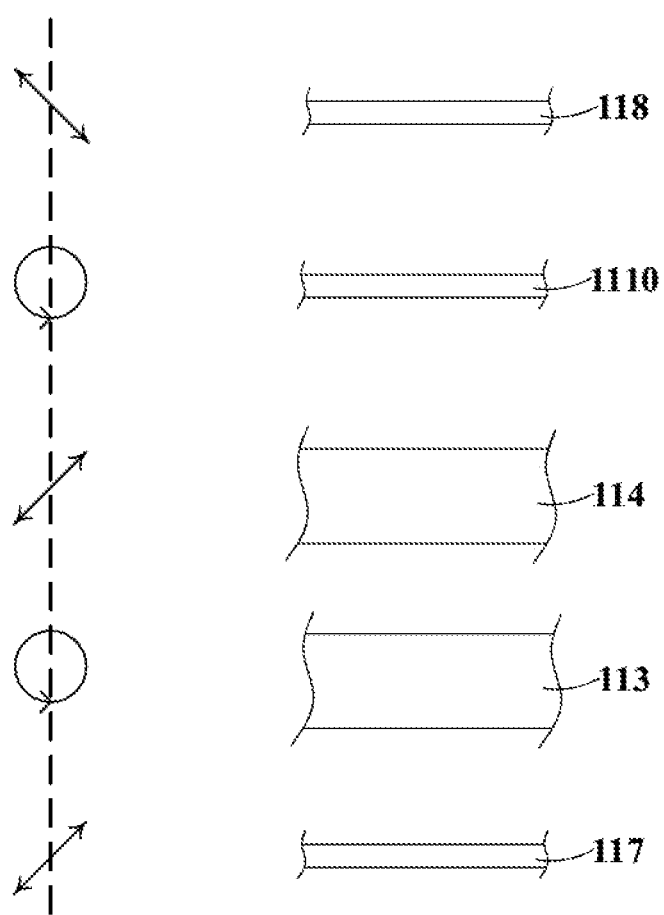
FIGS. 4A to 4B illustrates a work principle of a display panel in a transmissive display mode in some embodiments according to the present disclosure.
Figure 4B:
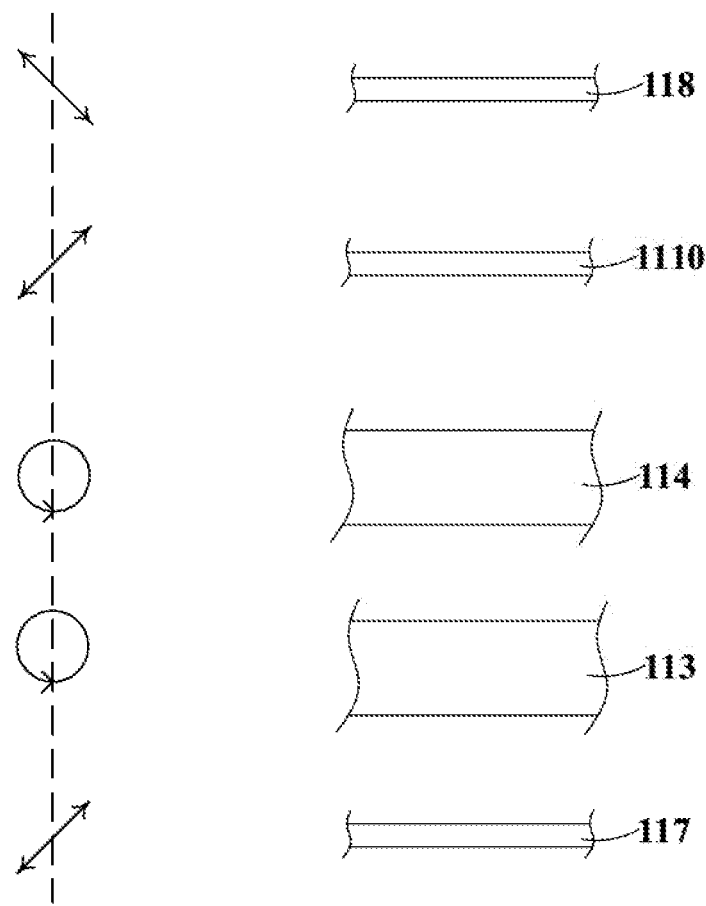

FIGS. 4A to 4B illustrates a work principle of a display panel in a transmissive display mode in some embodiments according to the present disclosure. Referring to FIG. 4A and FIG. 4B, when a light intensity of the ambient light is relatively low, the display panel 110 may be configured to display image in the transmissive mode. For example, in the transmissive display mode, a back light of the display panel may be turned on. The ambient light enters the display panel 110 from a side of the counter substrate 115 distal to the second liquid crystal layer 114. Light emitted from the back light transmits sequentially through the first polarizer 117, to the first liquid crystal layer 113, to the second liquid crystal layer 114, to the retardation film 1110, and then to the second polarizer 118.

Referring to FIG. 4A, in some embodiments, the display panel 110 is in the transmissive display mode. In FIG. 4A, a first electric field is applied to the first liquid crystal layer 113 and simultaneously a second electric field is applied to the second liquid crystal layer 114. Thus, the first liquid crystal layer 113 has an optical retardation value greater than zero (e.g., substantially equal to a quarter wavelength of an incident light) and the second liquid crystal layer 114 has an optical retardation value greater than zero (e.g., substantially equal to a quarter wavelength of an incident light). The incident ambient light first transmits through the first polarizer 117, and becomes a linearly polarized light. When the first electric field is applied to the first liquid crystal layer 113 and the second electric field is applied to the second liquid crystal layer 114, the linearly polarized light becomes a left circularly polarized light after transmitting through the first liquid crystal layer 113. The left circularly polarized light transmits through the second liquid crystal layer 114, and becomes a linearly polarized light again. The linearly polarized light then transmits through the retardation film 1110, and becomes a left circularly polarized light. The left circularly polarized light subsequently transmits through the second polarizer 118. In this mode, the display panel 110 is at bright state.

Referring to FIG. 4B, a first electric field is applied to the first liquid crystal layer 113, however, an electric field is not applied to the second liquid crystal layer 114. Thus, the first liquid crystal layer 113 has an optical retardation value greater than zero (e.g., substantially equal to a quarter wavelength of an incident light) whereas the second liquid crystal layer 114 has an optical retardation value substantially equal to zero. The incident light from the back light first transmits through the first polarizer 117, and becomes the linearly polarized light. When the first electric field is applied to the first liquid crystal layer 113 but an electric field is not applied to the second liquid crystal layer 114, the linearly polarized light transmits through the first liquid crystal layer 113, and becomes a left circularly polarized light. The left circularly polarized light transmits through the second liquid crystal layer 114, and remains as a left circularly polarized light because the second liquid crystal layer 114 has an optical retardation value substantially equal to zero. The left circularly polarized light then transmits through the retardation film 1110, and becomes a linearly polarized light having a polarization direction substantially perpendicular to the direction of the transmission axis of the second polarizer 118. Consequently, the linearly polarized light cannot pass through the second polarizer 118. In this mode, the display panel is at dark state.

Referring to FIGS. 2A to 2E, the first liquid crystal layer 113 has a first thickness t1 along a direction substantially from the first array substrate 111 toward the counter substrate 115, and the second liquid crystal layer 114 has a second thickness t2 along the direction substantially from the first array substrate 111 toward the counter substrate 115. Optionally, the first thickness t1 and the second thickness t2 are substantially the same. As used herein, the term "substantially the same" refers to a difference between two values not exceeding 10%, e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%. By having the first thickness t1 and the second thickness t2 to be substantially the same, a first optical path distance of the ambient light in the reflective display mode and a second optical path distance of the light emitted from the back light are substantially the same. Consequently, the optical phase of the light emitted from the display panel 110 in the reflective mode is substantially the same as the optical phase of the light emitted from the display panel 110 in the transmissive mode. Thus, the display panel 110 in the present disclosure obviates the problem of having inconsistent transmissive rate curves and normalization curves respectively in the reflective display mode and the transmissive display mode.

Figure 5:
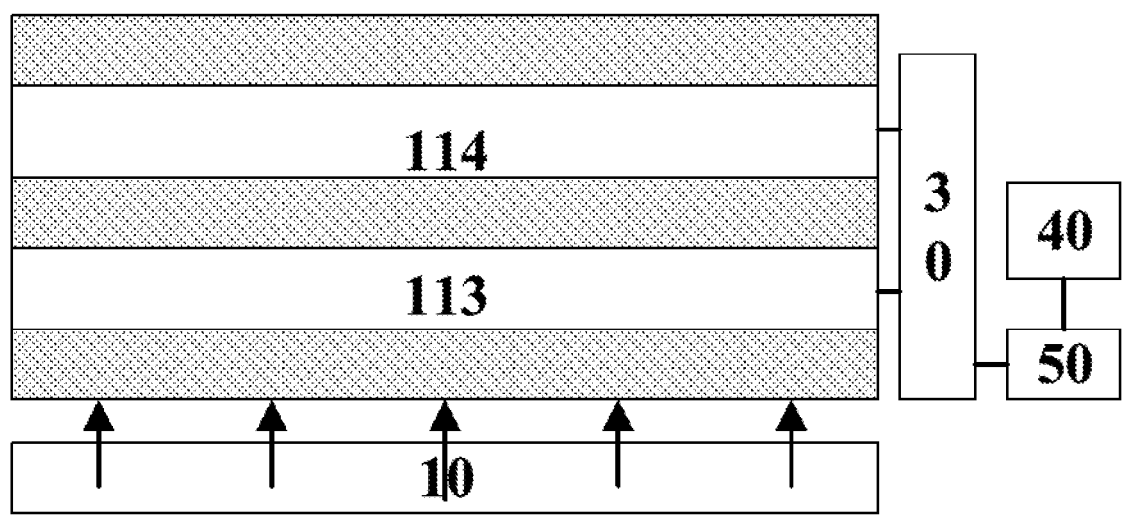
FIG. 5 is a schematic diagram illustrating the structure of a display apparatus in some embodiments according to the present disclosure.

In another aspect, the present disclosure provides a display apparatus having the display panel described herein or fabricated by a method described herein. FIG. 5 is a schematic diagram illustrating the structure of a display apparatus in some embodiments according to the present disclosure. Referring to FIG. 5, the display apparatus in some embodiments includes a back light 10, a display panel 20, and a driving circuit 30 configured to apply a first electric field to the first liquid crystal layer 113 and a second electric field to the second liquid crystal layer 114. In one example, the driving circuit 30 is configured to generate a first voltage difference between the first electrode layer and the second electrode layer, thereby applying the first electric field to the first liquid crystal layer 113. In another example, the driving circuit is configured to generate a second voltage different between the third electrode layer and the fourth electrode layer, thereby applying the second electric field to the second liquid crystal layer 114.

In some embodiments, the driving circuit 30 is configured to control the display mode of the display panel 20. In the reflective display mode, the driving circuit 30 is configured to apply the second electric field to the second liquid crystal layer 114, but not apply an electric field to the first liquid crystal layer 113. In the transmissive display mode, the driving circuit 30 is configured to simultaneously apply the first electric field to the first liquid crystal layer 113 and the second electric field to the second liquid crystal layer 114.

In the display apparatus of the present disclosure, two separated liquid crystal layers are used to achieve the reflective display mode and the transmissive display mode. The orientations of the liquid crystal molecules in the area corresponding to the junction of the reflective display region and the transmissive display region are consistent, substantially obviating the light leakage problem in the dark state due to the disorder of the liquid crystal molecules in the junction. Moreover, the optical phase of the light emitted from the display panel 20 in the reflective mode is substantially the same as the optical phase of the light emitted from the display panel 20 in the transmissive mode. Thus, the display panel 20 in the present disclosure obviates the problem of having inconsistent transmissive rate curves and normalization curves respectively in the reflective display mode and the transmissive display mode.

In some embodiments, the display apparatus further includes a light sensor 40 configured to measure the ambient light intensity, and a controller 50 configured to control the driving circuit 30. When ambient light intensity is no less than the threshold value, the light sensor 40 transmits a first control signal to the controller. Upon receiving the first control signal, the controller 50 is configured to control the driving circuit 30 to set the display apparatus in the reflective display mode. When the ambient light intensity is below the threshold value, the light sensor 40 transmits a second control signal to the controller. Upon receiving the second control signal, the controller 50 is configured to control the driving circuit 30 to set the display apparatus in the transmissive display mode.

In some embodiments, the display apparatus is a liquid crystal display apparatus. Examples of appropriate display apparatuses include, but are not limited to, an electronic paper, a mobile phone, a tablet computer, a television, a monitor, a notebook computer, a digital album, a GPS, etc.

In another aspect, the present disclosure provides a method of driving image display in a liquid crystal panel having a plurality of subpixels described herein or fabricated by a method described herein. In some embodiments, the method includes selectively driving image display in the display panel in a reflective display mode and a transmissive display mode. In the transmissive display mode, the method includes simultaneously applying a first electric field to the first liquid crystal layer and applying a second electric field to the second liquid crystal layer thereby controlling the display panel to display image in the transmissive display mode. Optionally, applying the first electric field to the first liquid crystal layer includes generating a first voltage difference between the first electrode layer and the second electrode layer, and applying the second electric field to the second liquid crystal layer includes generating a second voltage difference between the third electrode layer and the fourth electrode layer.

In some embodiments, in the transmissive display mode, the display panel can be controlled in a bright state and a dark state. In the bright state, light emitted from the back light can transmit through the display panel (e.g., through the second polarizer), thereby display an image. In the dark state, light emitted from the back light is blocked and does not transmit through the display panel. The method in some embodiments further includes selectively controlling the display panel in a dark state and a bright state when the display panel is controlled to be in the transmissive display mode. Optionally, the method includes applying the first electric field to the first liquid crystal layer (e.g., generating a first voltage difference between the first electrode layer and the second electrode layer); and applying the second electric field to the second liquid crystal layer (e.g., generating a second voltage difference between the third electrode layer and the fourth electrode layer), thereby controlling the display panel in the bright state. Optionally, the method includes applying the first electric field to the first liquid crystal layer (e.g., generating a first voltage difference between the first electrode layer and the second electrode layer), but does not apply an electric field to the second liquid crystal layer, thereby controlling the display panel in the dark state.

In some embodiments, in the reflective display mode, the display panel can be controlled in a bright state and a dark state. In the bright state, an incident ambient light reflected by the reflective layer can transmit through the display panel (e.g., through the second polarizer), thereby display an image. In the dark state, the incident ambient light reflected by the reflective layer is blocked and does not transmit through the display panel. The method in some embodiments further includes selectively controlling the display panel in a dark state and a bright state when the display panel is controlled to be in the reflective display mode. Optionally, the method includes applying the second electric field to the second liquid crystal layer (e.g., generating a second voltage difference between the third electrode layer and the fourth electrode layer), but does not apply an electric field to the first liquid crystal layer, thereby controlling the display panel in the bright state. Optionally, the method includes discontinue application of an electric field to both the first liquid crystal layer and the second liquid crystal layer, thereby controlling the display panel in the dark state.

In some embodiments, the method further includes generating the first control signal by the light sensor in response to an ambient light intensity equal to or higher than a threshold value; transmitting the first control signal to the controller; and setting the display panel in a reflective display mode upon receiving the first control signal. Optionally, the method further includes generating the second control signal by the light sensor in response to an ambient light intensity below the threshold value; transmitting the second control signal to the controller; and setting the display panel in a transmissive display mode upon receiving the second control signal. In some embodiments, the display panel is automatically controlled by the light sensor and the controller based on the intensity of the ambient light.

Optionally, the threshold value is about 1000 lux, about 2000 lux, about 5000 lux, about 7500 lux, about 10000 lux, about 20000 lux, about 30000 lux, about 40000 lux, about 45000 lux, about 50000 lux, about 55000 lux, about 60000 lux, about 70000 lux, about 80000 lux, about 90000 lux, or about 100000 lux. Optionally, the threshold value is about 20000 lux.

In another aspect, the present disclosure provides a method of fabricating a display panel having a plurality of subpixels. In some embodiments, the method includes forming a first array substrate, forming a first liquid crystal layer, forming a second array substrate, forming a second liquid crystal layer, forming a reflective layer, and forming a counter substrate. Optionally, the second array substrate is formed between the first array substrate and the counter substrate. Optionally, the first liquid crystal layer is formed between the first array substrate and the second array substrate. Optionally, the second liquid crystal layer is formed between second array substrate and the counter substrate. Optionally, the reflective layer is formed between the first liquid crystal layer and the second liquid crystal layer. Optionally, the display panel has a plurality of reflective regions and a plurality of transmissive regions, each of the plurality of subpixels having at least one of the plurality of reflective regions and at least one of the plurality of transmissive regions. Optionally, the reflective layer is formed in the plurality of reflective regions and absent in the plurality of transmissive regions.

In some embodiments, the method further includes forming a retardation film on a side of the second liquid crystal layer distal to the second array substrate. Optionally, the retardation film is formed to have an optical retardation value substantially equal to a quarter wavelength of an incident light.

In some embodiments, the method further includes forming a first polarizer on a side of the first array substrate distal to the first liquid crystal layer and forming a second polarizer on a side of the second liquid crystal layer distal to the second array substrate. Optionally, the retardation film is formed between the second polarizer and the counter substrate.

In some embodiments, the first liquid crystal layer is formed to have a first thickness along a direction substantially from the first array substrate toward the counter substrate, and the second liquid crystal layer is formed to have a second thickness along the direction substantially from the first array substrate toward the counter substrate. Optionally, the first liquid crystal layer and the second liquid crystal layer are formed so that the first thickness and the second thickness are substantially the same. As used herein, the term "substantially the same" refers to a difference between two values not exceeding 10%, e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%.

In some embodiments, the method further includes forming a first electrode layer and forming a second electrode layer configured to apply a first electric field to the first liquid crystal layer; and forming a third electrode layer and forming a fourth electrode layer configured to apply a second electric field to the second liquid crystal layer. Optionally, the first electrode layer is formed on a side of the first array substrate facing the second array substrate. Optionally, the second electrode layer is formed on a side of the second array substrate facing the first array substrate. Optionally, the first liquid crystal layer is formed between the first electrode layer and the second electrode layer. Optionally, the third electrode layer is formed on a side of the second array substrate facing the counter substrate. Optionally, the fourth electrode layer is formed on a side of the counter substrate facing the second array substrate. Optionally, the second liquid crystal layer is between the third electrode layer and the fourth electrode layer.

In some embodiments, the third electrode layer is formed to include a plurality of reflective electrode blocks respectively in the plurality of reflective regions and a plurality of substantially transparent electrode blocks respectively in the plurality of transmissive regions. The plurality of reflective electrode blocks constitute the reflective layer.

In some embodiments, the second electrode layer is formed to include a plurality of reflective electrode blocks respectively in the plurality of reflective regions and a plurality of substantially transparent electrode blocks respectively in the plurality of transmissive regions. The plurality of reflective electrode blocks constitute the reflective layer.

In some embodiments, the first liquid crystal layer and the second liquid crystal layer are formed so that each of the first liquid crystal layer and the second liquid crystal layer has an optical retardation value substantially equal to a quarter wavelength of an incident light upon application of an electric field. Optionally, the retardation film is formed to have an optical retardation value substantially equal to a quarter wavelength of an incident light Optionally, the reflective layer is on a side of the second array substrate facing the second liquid crystal layer. Optionally, the reflective layer is on a side of the second array substrate facing away the second liquid crystal layer.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display panel having a plurality of subpixels, comprising a first array substrate, a first liquid crystal layer, a second array substrate, a second liquid crystal layer, a retardation film on a side of the second liquid crystal layer distal to the second array substrate, a reflective layer, and a counter substrate;
   wherein the second array substrate is between the first array substrate and the counter substrate;
   the first liquid crystal layer is between the first array substrate and the second array substrate;
   the second liquid crystal layer is between second array substrate and the counter substrate; and
   the reflective layer is between the first liquid crystal layer and the second liquid crystal layer;
   wherein the display panel has a plurality of reflective regions and a plurality of transmissive regions, each of the plurality of subpixels having at least one of the plurality of reflective regions and at least one of the plurality of transmissive regions;
   the reflective layer is present in the plurality of reflective regions and absent in the plurality of transmissive regions; and
   a retardation phase of the first liquid crystal layer and a retardation phase of the second liquid crystal layer correspond to a retardation phase of the retardation film.

2. The display panel of claim 1, wherein the first liquid crystal layer, the second liquid crystal layer, and the retardation film are configured to respectively have retardation phases such that a linear polarized light is generated by the retardation film and provided to a second polarizer prior to exiting the display panel, upon application of a second electric field to the second liquid crystal layer but without a first electric field applied to the first liquid crystal layer.

3. The display panel of claim 2, wherein the first liquid crystal layer, the second liquid crystal layer, and the retardation film are configured to respectively have retardation phases such that a circularly polarized light is generated by the retardation film and provided to a second polarizer prior to exiting the display panel, upon application of a first electric field to the first liquid crystal layer and a second electric field to the second liquid crystal layer simultaneously.

4. The display panel of claim 1, further comprising a first polarizer on a side of the first array substrate distal to the first liquid crystal layer and a second polarizer on a side of the second liquid crystal layer distal to the second array substrate.

5. The display panel of claim 4, further comprising a retardation film between the second polarizer and the counter substrate.

6. The display panel of claim 4, wherein transmission axes of the first polarizer and the second polarizer are substantially perpendicular to each other.

7. The display panel of claim 4, wherein transmission axes of the first polarizer and the second polarizer are substantially parallel to each other.

8. The display panel of claim 1, wherein the first liquid crystal layer has a first thickness along a direction substantially from the first array substrate toward the counter substrate;
   the second liquid crystal layer has a second thickness along the direction substantially from the first array substrate toward the counter substrate; and
   the first thickness and the second thickness are substantially same.

9. The display panel of claim 1, further comprising:
   a first electrode layer and a second electrode layer configured to apply a first electric field to the first liquid crystal layer; and
   a third electrode layer and a fourth electrode layer configured to apply a second electric field to the second liquid crystal layer.

10. The display panel of claim 9, wherein the first electrode layer is on a side of the first array substrate facing the second array substrate, the second electrode layer is on a side of the second array substrate facing the first array substrate, and the first liquid crystal layer is between the first electrode layer and the second electrode layer; and
    the third electrode layer is on a side of the second array substrate facing the counter substrate, the fourth electrode layer is on a side of the counter substrate facing the second array substrate, and the second liquid crystal layer is between the third electrode layer and the fourth electrode layer.

11. The display panel of claim 10, wherein the third electrode layer comprises a plurality of reflective electrode blocks respectively in the plurality of reflective regions and a plurality of substantially transparent electrode blocks respectively in the plurality of transmissive regions; and
    the plurality of reflective electrode blocks constitute the reflective layer.

12. The display panel of claim 10, wherein the second electrode layer comprises a plurality of reflective electrode blocks respectively in the plurality of reflective regions and a plurality of substantially transparent electrode blocks respectively in the plurality of transmissive regions; and
    the plurality of reflective electrode blocks constitute the reflective layer.

13. The display panel of claim 1, wherein each of the first liquid crystal layer and the second liquid crystal layer has an optical retardation value substantially equal to a quarter wavelength of an incident light upon application of an electric field; and
    wherein the retardation film is a $\lambda/4$ retardation film.

14. The display panel of claim 1, wherein the reflective layer is on a side of the second array substrate facing the second liquid crystal layer.

15. The display panel of claim 1, wherein the reflective layer is on a side of the second array substrate facing away the second liquid crystal layer.

16. A display apparatus, comprising the display panel of claim 1, a back light, and a driving circuit configured to apply a first electric field to the first liquid crystal layer and a second electric field to the second liquid crystal layer.

17. A method of driving image display in a display panel having a plurality of subpixels;
- wherein the display panel comprises a first array substrate, a first liquid crystal layer, a second array substrate, a second liquid crystal layer, a retardation film on a side of the second liquid crystal layer distal to the second array substrate, a reflective layer, and a counter substrate;
- wherein the second array substrate is between the first array substrate and the counter substrate;
- the first liquid crystal layer is between the first array substrate and the second array substrate;
- the second liquid crystal layer is between second array substrate and the counter substrate; and
- the reflective layer is between the first liquid crystal layer and the second liquid crystal layer;
- wherein the display panel has a plurality of reflective regions and a plurality of transmissive regions, each of the plurality of subpixels having at least one of the plurality of reflective regions and at least one of the plurality of transmissive regions; and
- the reflective layer is present in the plurality of reflective regions and absent in the plurality of transmissive regions; and
- a retardation phase of the first liquid crystal layer and a retardation phase of the second liquid crystal layer correspond to a retardation phase of the retardation film;
- wherein the method comprises selectively driving image display in the display panel in a reflective display mode and a transmissive display mode.

18. The method of claim 17, comprising simultaneously applying a first electric field to the first liquid crystal layer and applying a second electric field to the second liquid crystal layer thereby controlling the display panel to display image in the transmissive display mode.

19. The method of claim 17, comprising applying a second electric field to the second liquid crystal layer thereby controlling the display panel to display image in the reflective display mode.

20. The method of claim 19, wherein an electrical field is not applied to the first liquid crystal layer.

* * * * *